United States Patent
Jiang

(10) Patent No.: US 10,719,448 B2
(45) Date of Patent: Jul. 21, 2020

(54) CACHE DEVICES WITH CONFIGURABLE ACCESS POLICIES AND CONTROL METHODS THEREOF

(71) Applicant: ALIBABA GROUP HOLDING LIMITED, George Town, Grand Cayman (KY)

(72) Inventor: Xiaowei Jiang, San Mateo, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/622,010

(22) Filed: Jun. 13, 2017

(65) Prior Publication Data

US 2018/0357175 A1    Dec. 13, 2018

(51) Int. Cl.
*G06F 12/0888* (2016.01)
*G06F 12/0802* (2016.01)
*G06F 12/126* (2016.01)
*G06F 12/14* (2006.01)

(52) U.S. Cl.
CPC ...... *G06F 12/0888* (2013.01); *G06F 12/0802* (2013.01); *G06F 12/126* (2013.01); *G06F 12/1483* (2013.01); *G06F 2212/60* (2013.01); *G06F 2212/601* (2013.01)

(58) Field of Classification Search
CPC ............. G06F 12/0888; G06F 12/0802; G06F 12/126; G06F 12/1483; G06F 2212/60; G06F 2212/601
See application file for complete search history.

(56) References Cited

U.S. PATENT DOCUMENTS

| | | | | |
|---|---|---|---|---|
| 8,606,998 | B2 * | 12/2013 | Zulauf | G06F 12/0862 711/125 |
| 2007/0079073 | A1 | 4/2007 | Rosenbluth et al. | |
| 2010/0153648 | A1 * | 6/2010 | Arimilli | G06F 9/383 711/125 |
| 2015/0019840 | A1 * | 1/2015 | Anderson | G06F 9/30145 712/206 |
| 2015/0046651 | A1 | 2/2015 | Luttrell | |

OTHER PUBLICATIONS

David A. Patterson and John L. Hennessy. Computer Organization and Design, Fourth Edition, Fourth Edition: The Hardware/Software Interface (The Morgan Kaufmann Series in Computer Architecture and Design) (4th ed.). Morgan Kaufmann Publishers Inc., San Francisco, CA, USA. (Year: 2008).*

(Continued)

*Primary Examiner* — Ramon A. Mercado
(74) *Attorney, Agent, or Firm* — Finnegan, Henderson, Farabow, Garrett & Dunner LLP

(57) ABSTRACT

A cache is presented. The cache comprises a tag array configured to store one or more tag addresses, a data array configured to store data acquired from a dynamic random access memory device, and a cache controller. The cache controller is configured to: receive a cache access request; determine, based on an indication associated with the cache access request, a cache access policy; and perform an operation to the tag array and to the data array based on the determined cache access policy.

19 Claims, 14 Drawing Sheets

(56) References Cited

OTHER PUBLICATIONS

Joel Emer, Cache Optimizations, Computer Science and Artificial Intelligence Laboratory Massachusetts Institute of Technology, Oct. 5, 2005. (Year: 2005).*
D. F. Zucker, R. B. Lee and M. J. Flynn, "Hardware and software cache prefetching techniques for MPEG benchmarks," in IEEE Transactions on Circuits and Systems for Video Technology, vol. 10, No. 5, pp. 782-796, Aug. 2000. (Year: 2000).*
PCT International Search Report dated Aug. 31, 2018, issued in corresponding International Application No. PCT/US2018/037202 (2 pgs.).
PCT International Written Opinion dated Aug. 31, 2018, issued in corresponding International Application No. PCT/US2018/037202 (11 pgs.).

\* cited by examiner

340

340

CACHE DEVICES WITH CONFIGURABLE ACCESS POLICIES AND CONTROL METHODS THEREOF

TECHNICAL FIELD

The present disclosure generally relates to the field of computer architecture, and more particularly, to cache devices with configurable access policies, and control methods thereof.

BACKGROUND

Volatile memory, such as dynamic random-access memory (DRAM), provides temporary storage space that can be accessed by a computer processor at a reasonable speed. The volatile memory can be used to store instructions and data, which can then be fetched to the computer processor for processing. The computer processor can also store a result of the processing into the volatile memory for subsequent processing. Although DRAM provides reasonable access speed, memory access latency remains a bottleneck to the computer processor, as the processing speed of computer processor, as well as the storage capacity of DRAM, keeps increasing thanks to Moore's Law. Accordingly, contemporary computer processors typically deploy a hierarchical memory system including a cache device, to speed up memory access.

Cache device typically provides a smaller storage space, but at higher access speed, than a DRAM device. The computer processor can use the cache device to store data that is likely to be accessed in the future. To store new data in the cache device, the computer processor may also need to evict old data from the cache device to make room for the new data.

SUMMARY

Embodiments of the present disclosure provide a cache. The cache comprises a tag array configured to store one or more tag addresses, a data array configured to store data acquired from a dynamic random access memory device, and a cache controller. The cache controller is configured to receive a cache access request and determine, based on an indication associated with the cache access request, a cache access policy. The cache controller is also configured to perform an operation to the tag array and to the data array based on the determined cache access policy.

Embodiments of the present disclosure also provide a method of operating a cache that comprises a tag array, a data array, and a cache controller. The method is performed by the cache controller and comprises: receiving a cache access request; determining, based on an indication associated with the cache access request, a cache access policy; and performing an operation to the tag array and to the data array based on the determined cache access policy.

Embodiments of the present disclosure also provide a computer system that comprises a hardware processor and a hierarchical memory system. The hardware processor is configured to process a memory access instruction that includes an indication for a cache access policy, and generate a cache access request including information related to the indication. The hierarchical memory system is coupled with the hardware processor and comprises a dynamic random access memory device and a cache. The cache comprises a tag array configured to store one or more tag addresses, a data array configured to store data acquired from the dynamic random access memory device, and a cache controller. The cache controller is configured to receive the cache access request from the hardware processor and determine, based on the information included in cache access request, a cache access policy. The cache controller is also configured to perform an operation to the tag array and to the data array based on the determined cache access policy.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Embodiments of the present disclosure provide a cache device with configurable access policies. The cache device may receive an indication related to a cache access policy from a computer processor generated from a memory access instruction. Based on the indication, the cache device can determine whether to store data into the cache device, to bypass the cache device and store the data in some other devices, or to evict certain cache data from the cache device. With such arrangements, the computer processor can be programmed to determine which cache data is to be overwritten and evicted, and when the cache data is to be overwritten and evicted. This allows the determination of whether to retain, update, or evict cache data to be tailored according to a specific sequence of data operations. As a result, cache access can be made more flexible, which can in turn improve the operation efficiency of the cache device and of the computer system as a whole.

Figure 1:
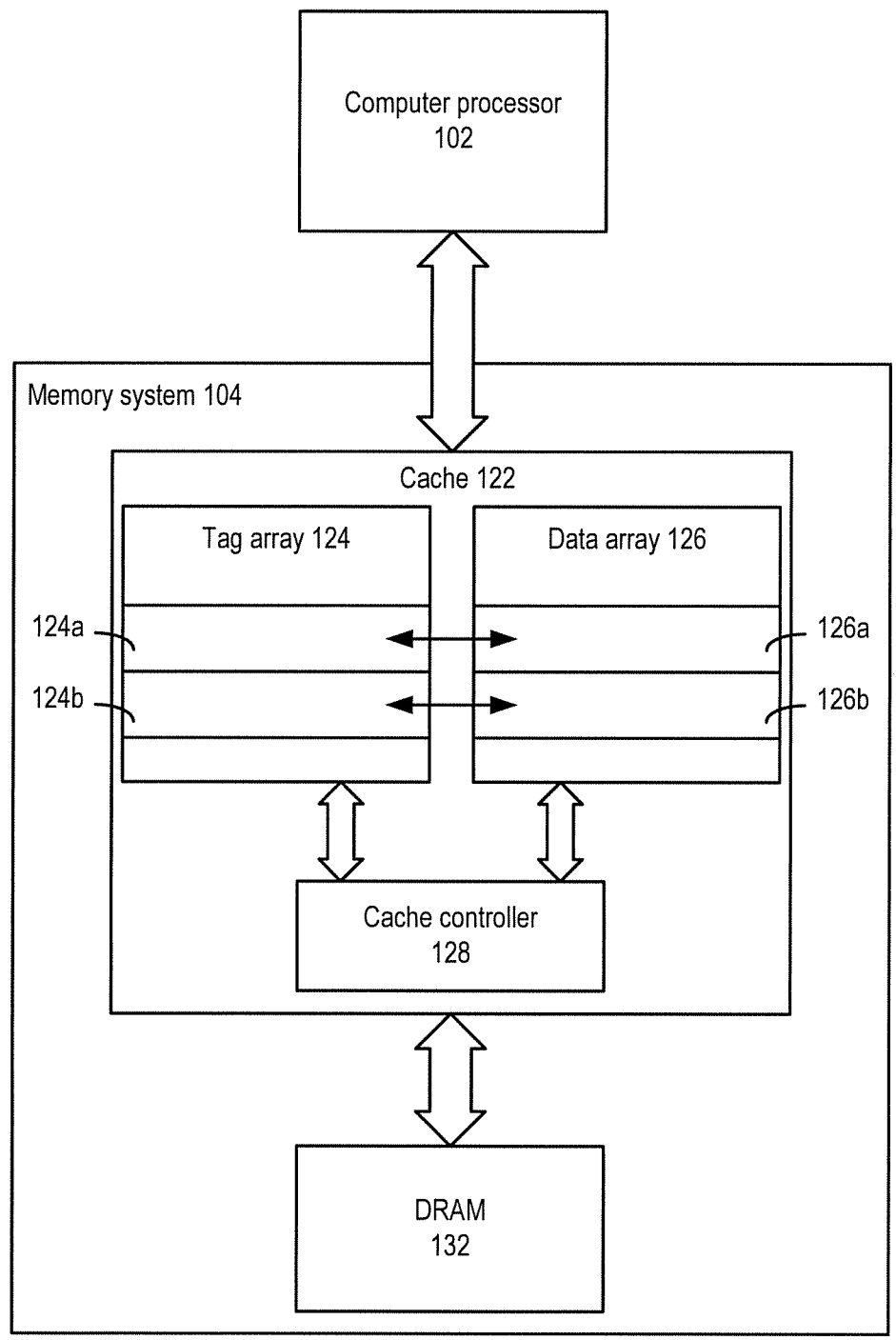
FIG. 1 is a diagram illustrating an exemplary computer system in which embodiments of the present disclosure can be used.

Reference is now made to FIG. 1, which illustrates a computer system 100 in which embodiments of the present disclosure can be used. As shown in FIG. 1, computer system 100 includes a computer processor 102 and a hierarchical memory system 104. Memory system 104 includes a cache 122 and a DRAM 132. Although FIG. 1 illustrates that cache 122 is separate from computer processor 102, it is understood that cache 122 can also be a part of an integrated circuit chip that includes computer processor 102. Cache 122 can also be a part of an integrated circuit chip that includes DRAM 132, or can exist as a standalone chip.

Cache 122 is typically built using static random-access memory (SRAM) devices, which provide higher access speed than a DRAM device but also include more transistors and consume more power than a DRAM device of the same storage capacity. Cache 122 can be used as an intermediate buffer to store a subset of data stored in DRAM 132, such that the data stored in cache 122 correspond to at least a part of the data stored in DRAM 132. That subset of data are typically the most recently accessed data by computer processor 102, which can include data that are acquired from DRAM 132 according to a data read operation, or data that are modified by computer processor 102 and to be stored in DRAM 132 according to a data write operation. Due to temporal and spatial localities, such data (as well as other data that are stored in nearby memory locations) are likely going to be accessed by computer processor 102 again. When computer processor 102 tries to access such data again, it can read it from cache 122 (which results in a cache hit) instead of from DRAM 132. By increasing the access speed of these data, the effect of access latency of DRAM 132 on the overall performance of computer system 100 can be reduced.

As shown in FIG. 1, cache 122 includes a tag array 124, a data array 126, and a cache controller 128. Cache 122 may be direct-mapped. Both tag array 124 and data array 126 includes a plurality of entries, including tag entries 124a and 124b, and data entries 126a and 126b. After acquiring memory data from DRAM 132, data array 126 stores the memory data that was accessed (or will likely be accessed) by computer processor 102. The data stored in each data entry of data array 126 are associated with a tag address stored in a corresponding tag entry. For example, data stored in data entry 126a can be associated with a tag address stored in tag entry 124a. Moreover, data stored in data entry 126b can be associated with a tag address stored in data entry 124b. The tag address can be derived from the memory address of that data in DRAM 132. For example, the tag address can be generated by extracting a predetermined number of leftmost bits from the memory address. Tag array 124 can also store control information for cache operation with each tag address, such as a flag that indicates whether a tag entry and a data entry stores data, as well as least recently used (LRU) information (not shown in FIG. 1). The flag can signal that a particular pair of tag entry and data entry is empty and can be used to store new data. When cache 122 is full (e.g., when none of the tag and data entries is associated with an empty flag), the LRU information enables a determination of which of the tag and data entries are to be vacated in order to evict old data to make room for the new data.

Cache controller 128 manages the read and write operations to cache 122. Cache controller 128 can include digital logic circuitries, and can be either a standalone application specific integrated circuit (ASIC), a field programmable gate array (FPGA), or a part of computer processor 102. Cache controller 128 may also be capable of executing instructions (e.g., firmware, micro-codes, etc.) to control the read and write operations. The instructions may be stored in a computer readable medium that may be volatile or non-volatile, magnetic, semiconductor, tape, optical, removable, non-removable, etc., and is accessible by cache controller 128. When computer processor 102 executes a memory access instruction, it can issue a cache access request to cache controller 128. The cache access request includes a memory address associated with the memory access instruction. Upon receiving the cache access request, cache controller 128 can determine a tag address based on the memory address (e.g., by extracting a predetermined number of leftmost bits from the memory address). Cache controller 128 can perform a read operation to tag array 124 to determine whether it stores a matching tag address. In a case where the cache is a direct-mapped cache, if a matching tag address is found in one of the tag entries in tag array 124, cache controller 128 can determine that there is a cache hit. On the other hand, if a matching tag address cannot be found, cache controller 128 can determine that there is a cache miss.

In the case of cache hit, for a cache read access request, cache controller 128 can then perform a read operation to the data entry that corresponds to the matching tag entry, and transmit the data stored in the data entry back to computer processor 102. For a cache write access request, cache controller 128 can also perform a write operation to the data entry that corresponds to the matching tag entry. The data stored in that data entry can then be transferred back to DRAM 132 to ensure coherency between cache 122 and DRAM 132.

On the other hand, when there is a cache miss, cache controller 128 can obtain new memory data from DRAM 132 (for a read operation), and store the new memory data in the empty entries of cache 122 (if available). For a write operation, cache controller 128 may also receive the new write data from computer processor 102 and store the new write data in the empty entries of cache 122 (if available). If the cache is full, cache controller 128 may determine which tag and data entry to be evicted based on the LRU information to make room for new data. For example, certain data that was written into the cache at an earlier time and has not been accessed again since that time, can be flagged as LRU. Cache controller 128 can evict the data flagged as LRU, and store the new data in the data entry used to be occupied by the evicted data. Cache controller 128 can also update the LRU information of the newly-stored data, as well as the LRU information of other data in the cache that is the subject of a read/write access request.

Figure 2A:
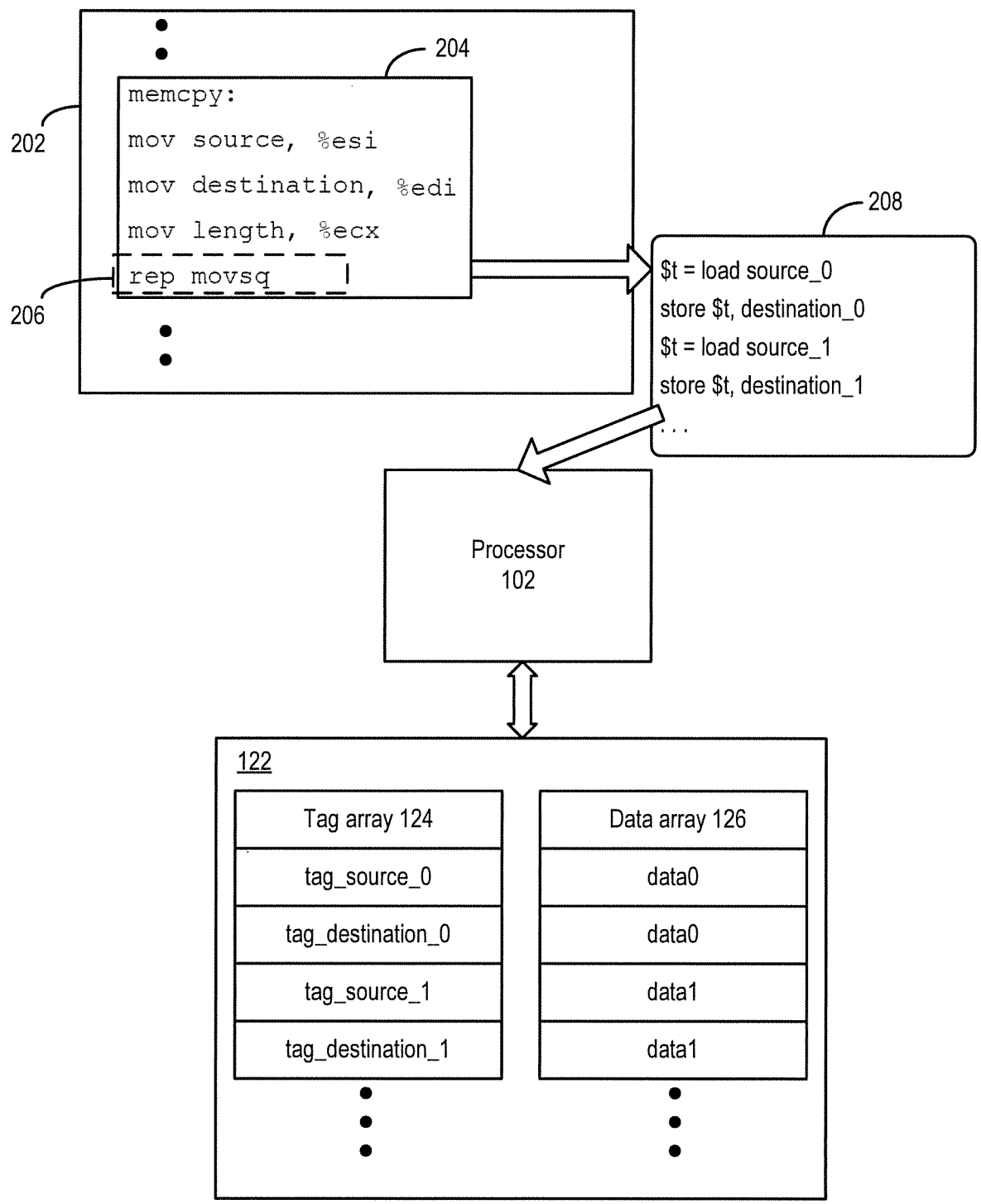
FIGS. 2A-2D are diagrams illustrating exemplary operations of the computer system of FIG. 1.
Figure 2B:
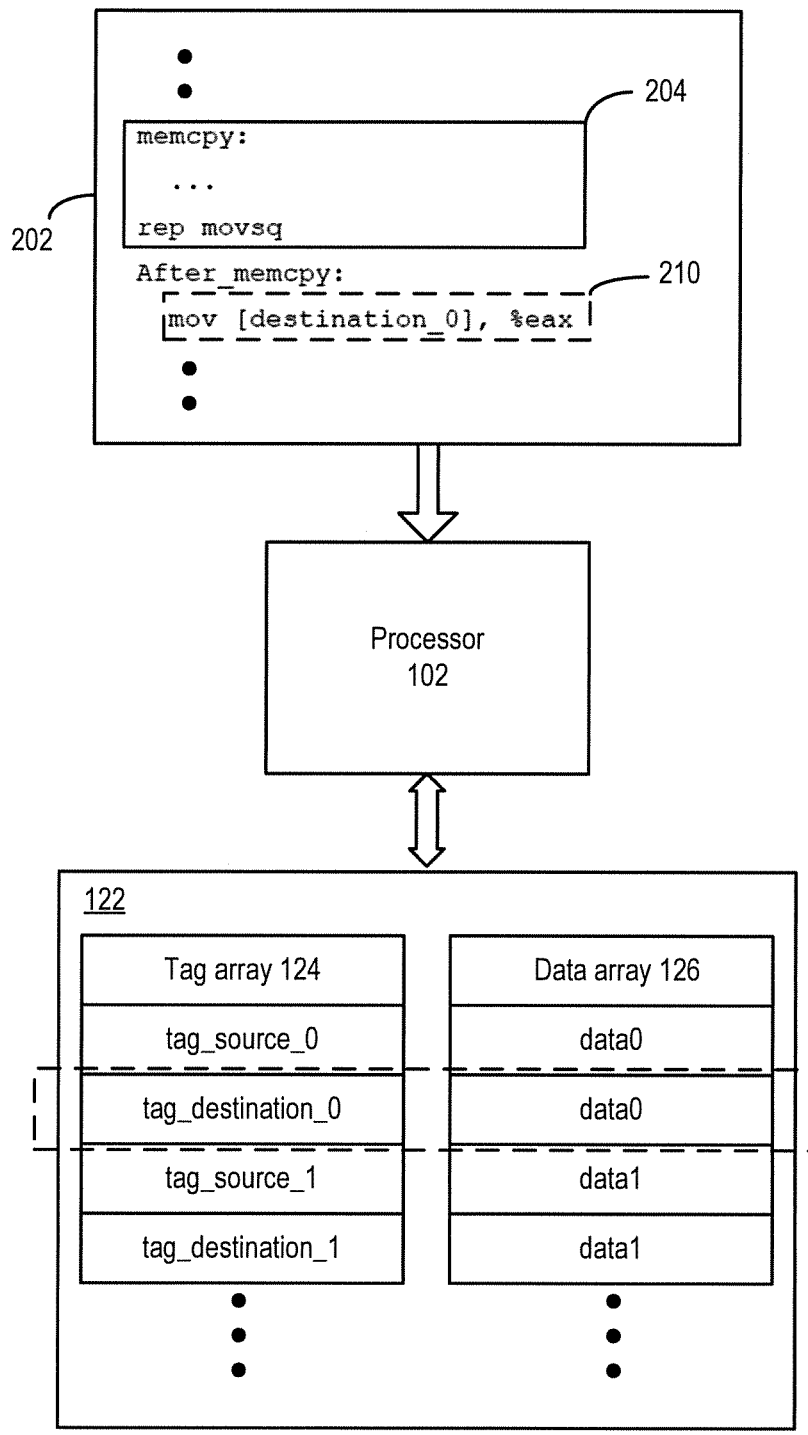

Reference is now made to FIGS. 2A-2D, which illustrate exemplary operations of cache 122 of FIG. 1. As shown in FIG. 2A, computer processor 102 can execute a program 202 that includes a memcpy (memory copy) program instruction 204. Memcpy instruction 204 may include a "rep movsq" instruction 206 that can program computer processor 102 to repetitively copy blocks of data from one memory location to another memory location. The "rep movsq" instruction 206 can be compiled by a software compiler into a set of executable instructions 208, each of which can be represented in binary form to be processed by computer processor 102. Instructions 208 may include a set of memory read operations (e.g., "load") for loading data from a set of source memory locations, and a set of memory write operations (e.g., "store") for storing those data in a set of destination memory locations. The set of source memory locations may be associated with a first set of memory addresses "source_0," "source_1," etc. The set of destination memory locations may be associated with a second set of memory addresses "destination_0," "destination_1," etc.

For each of instructions 208, computer processor 102 can issue a cache access request to, for example, read data from cache 122, or to write data into cache 122, etc. Cache controller 128 also generates tag addresses from the set of source addresses (e.g., "source_0," "source_1," "destination_0," and "destination_1," etc.). For example, tag address "tag_source_0" may be generated from source memory address "source_0," and tag address "tag_source_1" may be generated from source memory address "source_1." Assuming that the data to be read by the read operations of memcpy instruction 204 is not stored in cache 122 when the instruction is executed, cache controller 128 can determine that the tag addresses "tag_source_0" and "tag_source_1" cannot be found in cache 122, indicating a cache miss. Therefore, cache controller 128 obtains memory data (e.g., "data0," "data1," etc.) associated with the first set of memory addresses (e.g., "source_0," "source_1," etc.) from DRAM 132, and stores the memory data in the data entries in data array 126. Cache controller 128 also stores the tag addresses in the tag entries in tag array 124 associated with these data entries. Computer processor 102 also stores the memory data in a set of registers configured to store values for variables (e.g., "$t").

Moreover, for those instructions 208 that are associated with memory write operations (e.g., "store"), cache controller 128 also generates tag addresses from the set of destination addresses. For example, tag address "tag_destination_0" may be generated from destination memory address "destination_0," and tag address "tag_destination_1" may be generated from destination memory address "destination_1." Assuming that the data to be overwritten by the write operations of memcpy instruction 204 is not in cache 122 when the instruction is executed, cache controller 128 can determine that the tag addresses "tag_destination_0" and "tag_destination_1" cannot be found in cache 122, indicating a cache miss. Cache controller 128 can obtain the memory data to be overwritten from DRAM 132, and store the memory data in the data entries in data array 126, and the tag addresses in the corresponding tag entries in tag array 124. Cache controller 128 also overwrites the memory data (now stored in data array 126) with the write data, which computer processor 102 provides after accessing the registers to obtain the value stored for the variable "$t."

The data accessed by memcpy instruction 204 are stored in cache 122. Due to temporal and spatial localities, at least some of these data are likely to be accessed by computer processor 102 again in the future. For example, referring to FIG. 2B, program 202 may further include a memory access instruction 210 that is to be executed after memcpy instruction 204 is executed. Memory access instruction 210 may include a read operation to a memory location (associated with address "destination_0") among the set of destination memory locations accessed by memcpy instruction 204. When executing memory access instruction 210, computer processor 102 can access data associated with the address "destination_0" (after generating the tag address "tag_destination_0") from cache 122, which provides higher access speed when compared to the slower DRAM 132. With such arrangements, the effect of access latency of DRAM 132 on the overall performance of computer system 100 can be reduced.

In some cases, however, storing of data accessed by memcpy instruction 204 in cache 122 may cause delay to the execution of other memory access instructions, and may degrade the overall performance of computer system 100.

Figure 2C:
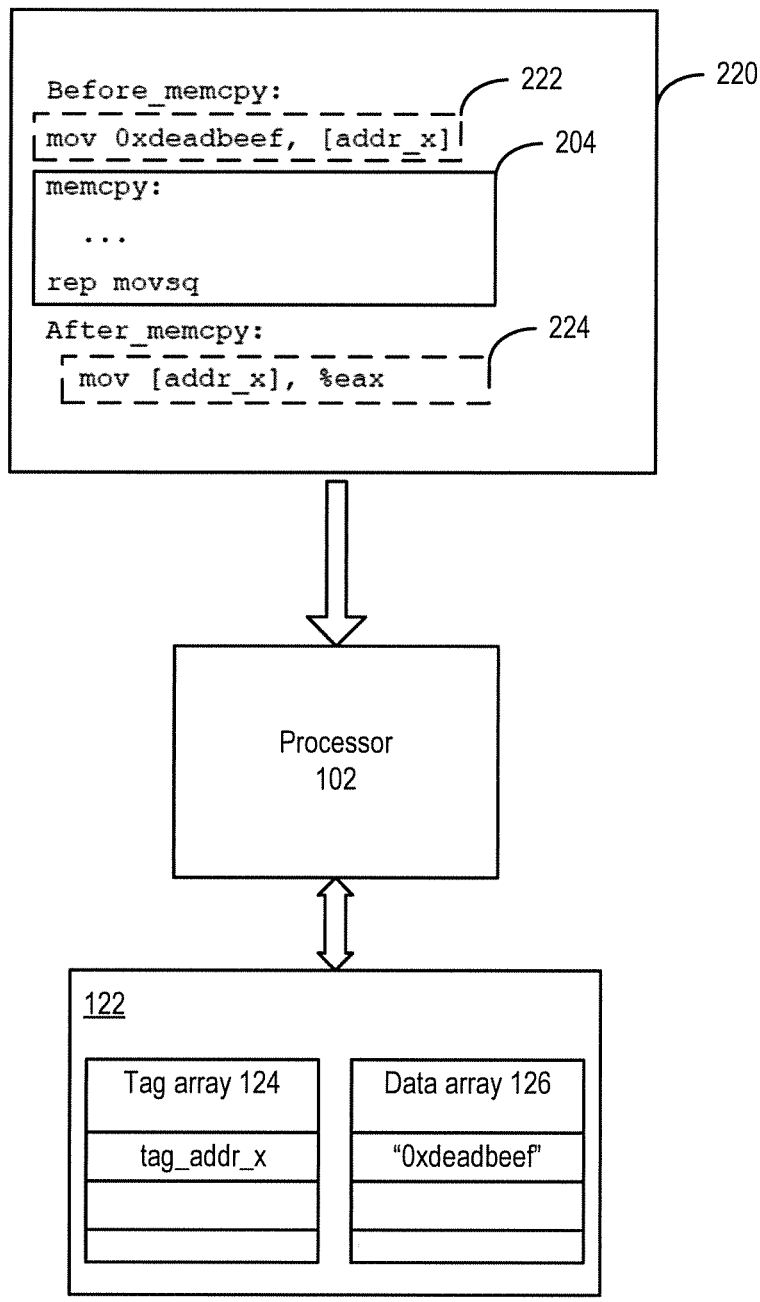

For example, referring to FIG. 2C, program 220 includes memory access instructions 222 and 224 that are to be executed, respectively, before and after the execution of memcpy instruction 204. Memory access instruction 222 may include a store operation that stores a hexadecimal number of "0xdeadbeef" at a predetermined memory location associated with a memory address "addr_x." After the execution of memory access instruction 222, cache 122 may store the value "0xdeadbeef" in data array 126, and the associated tag address "tag_addr_x" (generated from the memory address "addr_x") in tag array 124. Due to temporal and spatial localities, these data are likely to be accessed by computer processor 102 again in the future. For example, as shown in FIG. 2C, memory access instruction 224, which is to be executed after the execution of memory access instruction 222, includes a read operation to the memory address "addr_x." If the data stored by memory access instruction 222 remains in cache 122 by the time computer processor 102 executes memory access instruction 224, computer processor 102 can obtain the data from cache 122, instead of from DRAM 132, which can speed up the execution of memory access instruction 224.

Cache 122, however, may evict the data associated with the "addr_x" address during the execution of memcpy instruction 204 when, for example, cache 122 becomes full. After the execution of memcpy instruction 204 completes, computer processor 102 proceeds to execute instruction 224, which (as discussed above) includes a read operation from the memory address "addr_x." Since the data associated with the memory address "addr_x" has been evicted, memory controller 128 may have to obtain the data again from DRAM 132, and overwrite some of the newly-stored data of memcpy instruction 204.

Because the execution of memcpy instruction 204 results in additional accesses to DRAM 132 for the data requested by memory access instruction 224, the execution of memory access instruction 224 incurs additional delay. On the other hand, since some of the newly-stored data of memcpy instruction 204 has also been evicted (to make room for the data associated with the memory address "addr_x," these evicted data may need to be read from DRAM 132 again later then computer processor 102 executes other instructions that use these evicted data. Therefore, the benefit of storing the data accessed by memcpy instruction 204 (to avoid access to DRAM 132, which incurs extra delay) is lost as well. As a result, the overall performance of computer system 100 may be degraded.

Figure 2D:
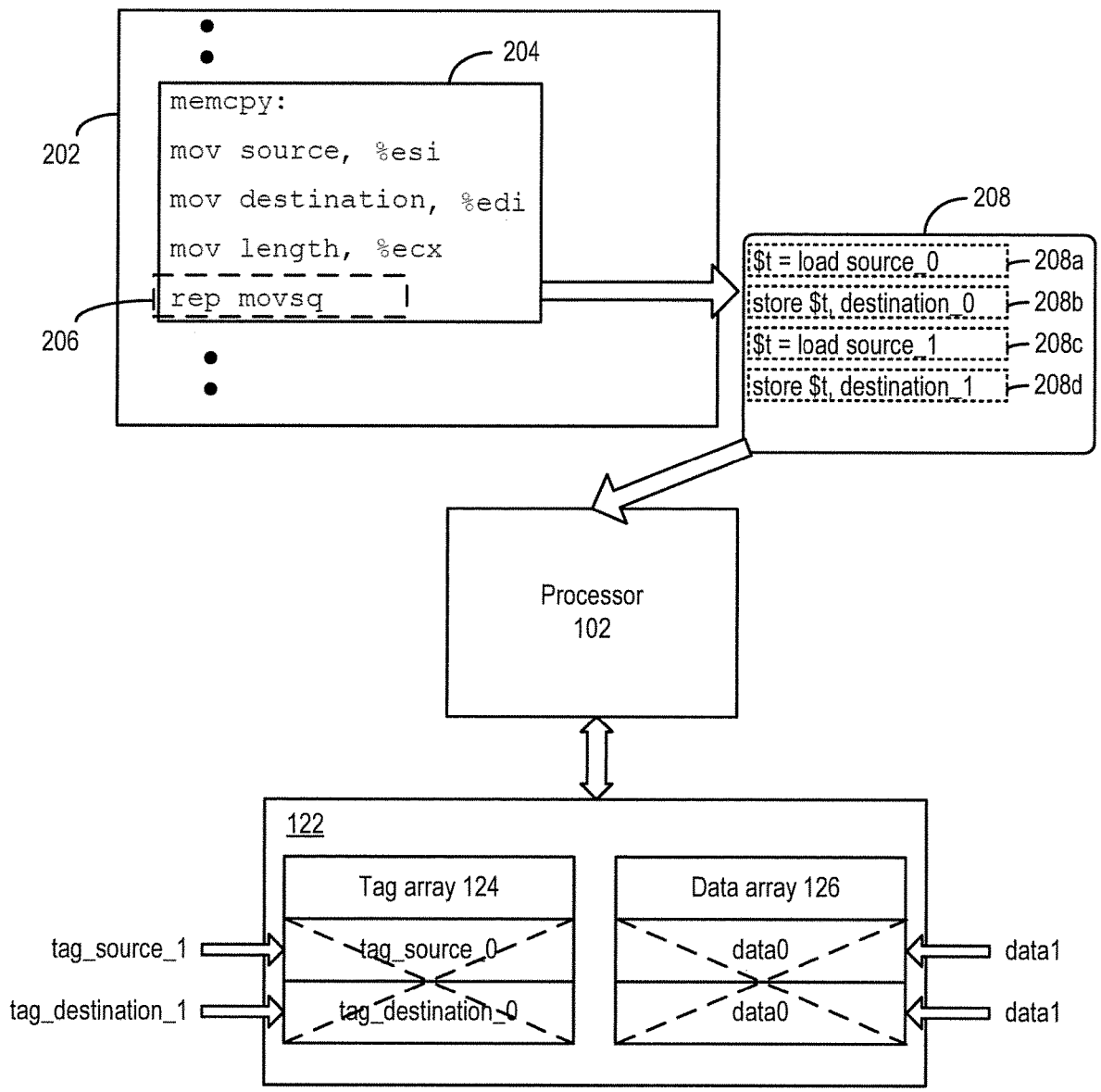

FIG. 2D illustrates another case where indiscriminate caching of data accessed by memcpy instruction 204 may introduce delay to the computer system. As an illustrative example, as shown in FIG. 2D, cache 122 has only two tag entries and two data entries. After the execution of the first two instructions 208a and 208b of program 208, cache 122 may become full. Cache controller 128 may evict some of the data that were written into cache 122 earlier (e.g., "data0") for new data (e.g., "data1") of the subsequent instructions 208c and 208d.

Although due to temporal and spatial localities, some of the data stored in cache 122 may be used by computer processor 102, not all of these data are likely to be used. For example, it is more likely that computer processor 102 will reuse either the type of data associated with the set of source addresses, or the type of data associated with the destination addresses, but not both types. Therefore, the benefit of storing both types of data associated with the source and destination addresses in cache 122 may provide little benefit to the overall performance of computer system 100. On the other hand, because cache 122 stores both types of data and it later becomes full, some of the data (including the data that is likely to be reused by computer processor 102) may be evicted to accommodate new data, which may force computer processor 102 to obtain the evicted data from DRAM 132 when these data is needed. Therefore, the benefit of storing these data to take advantage of temporal and spatial locality will be lost as well. As a result, the overall performance of computer system 100 may be degraded.

Figure 3A:
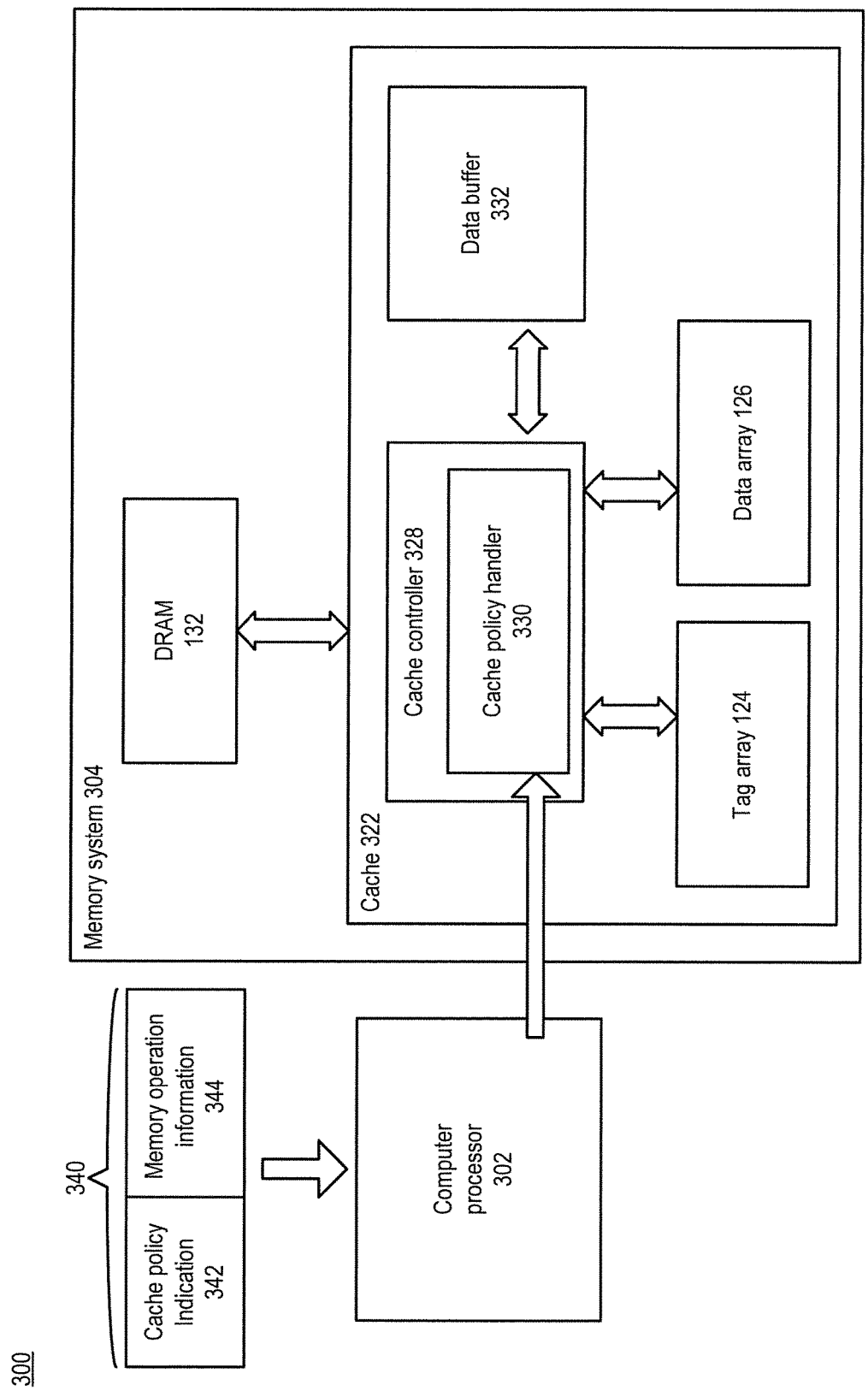
FIGS. 3A-3C are diagrams illustrating an exemplary cache and inputs handled by the cache, consistent with embodiments of the present disclosure.

Reference is now made to FIG. 3A, which illustrates an exemplary computer system 300 according to embodiments of the present disclosure. As shown in FIG. 3A, computer system 100 includes a computer processor 302 and a hierarchical memory system 304. Memory system 304 includes a cache 322, and DRAM 132. Although FIG. 3A illustrates that cache 322 is separate from computer processor 302, it is understood that cache 322 can also be a part of an integrated circuit chip that includes computer processor 302. Cache 322 can also be a part of an integrated circuit chip that includes DRAM 132, or can exist as a standalone chip. Cache 322 can be a direct-mapped cache.

As shown in FIG. 3A, cache 322 includes tag array 124 and data array 126 of FIG. 1, as well as a cache controller 328. Cache controller 328 can include digital logic circuitries, and can be either a standalone application specific integrated circuit (ASIC), a field programmable gate array (FPGA), or a part of computer processor 102. Cache controller 328 may also be capable of executing instructions (e.g., firmware, micro-codes, etc.) to control the read and write operations. The instructions may be stored in a computer readable medium that may be volatile or non-volatile, magnetic, semiconductor, tape, optical, removable, non-removable, etc., and is accessible by cache controller 328. Cache controller 328 also includes a cache policy handler 330. Cache 322 further includes a data buffer 332, which can include digital logic circuitries and can be configured to provide temporary storage for data obtained from DRAM 132. As to be discussed in more details below, cache policy handler 330 can be configured to implement a specific cache access policy. Cache policy handler 330 can also coordinate with data buffer 332 to access cache 322 according to the configured cache access policy.

In some embodiments, cache policy handler 330 can be configured by computer processor 302 to implement a specific cache access policy when handling a cache access request. Computer processor 302 can generate a cache access request (e.g., a read request, a write request, etc.) when executing a memory access executable instruction 340, and can configure cache policy handler 330 to implement the specific cache access policy when handling that cache access request. Memory access instruction 340 may include cache policy indication 342 and memory operation information 344. Cache policy indication 342 may include a code associated with a specific cache access policy, which can be decoded by computer processor 302. Memory operation information 344 can include information indicating a type of memory access operation (e.g., a read operation, a write operation, etc.), as well as other data related to that memory access operation (e.g., a memory address for read and write operations, write data to be stored in the memory in a write operation, etc.).

Figure 3B:
Figure 3C:
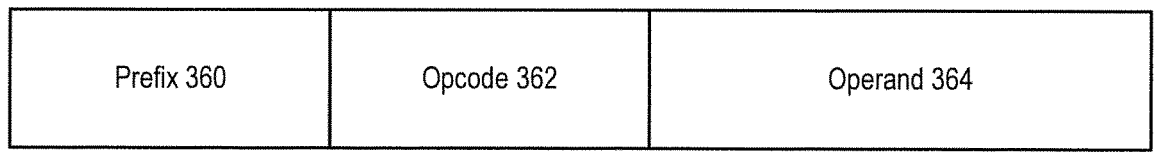

FIGS. 3B and 3C illustrate examples of memory access instruction 340. As shown in FIG. 3B, memory instruction 340 may include an opcode 350 and an operand 360. Opcode 350 may include information that indicates a specific cache access policy, as well as information that indicates a type of memory access operation. As an illustrative example, opcode 350 may include a first set of bits to provide cache access policy indication 342, and a second set of bits to provide a part of memory access operation information 344. As another illustrative example, different values of opcode 350 can be associated with different combinations of access policy types and memory access operation types. On the other hand, operand 352 may include the rest of memory access operation information 344 including, for example, a memory address for read and write operations, and write data to be stored in the memory in a write operation, etc.

FIG. 3C illustrates another example of memory instruction 340. As shown in FIG. 3C, memory instruction 340 may include a prefix 360, an opcode 362, and an operand 364. Prefix 360 may include cache policy indication 342. Opcode 362 may include a part of memory access operation information 344 that indicates a type of memory access operation. Operand 364 may include the rest of memory access operation information 344 (e.g., memory addresses for read and write operations, write data to be stored in the memory in a write operation, etc.).

Referring back to FIG. 3A, in some embodiments, cache controller 328 can support a set of cache access policies, and can be configured to implement a specific cache access policy according to cache policy indication 342. The set of cache access policies may include, for example, different policies about evicting data stored in predetermined entries of tag array 324 and data array 326. The set of cache access policies may also include, for example, different policies about storing data into predetermined entries of tag array 324 and data array 326.

Figure 4A:
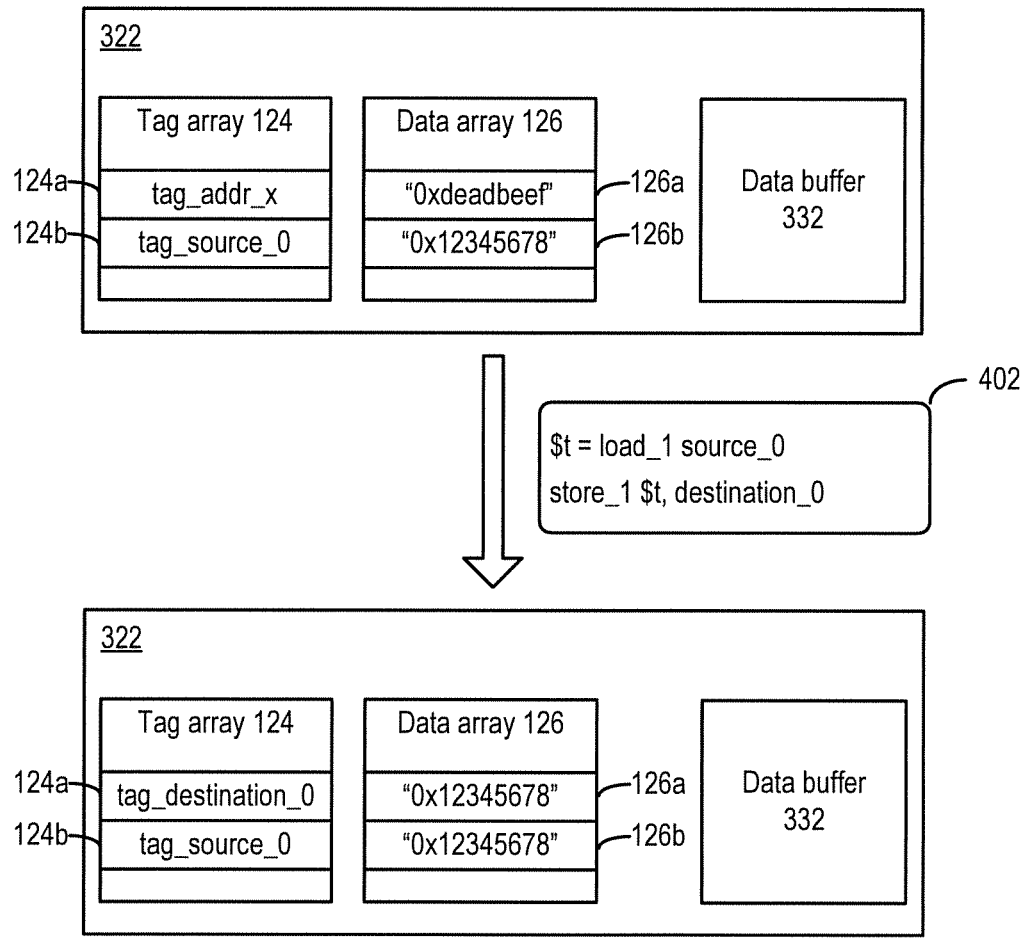
FIGS. 4A-4C are diagrams illustrating exemplary operations of the cache of FIG. 3A.
Figure 4B:
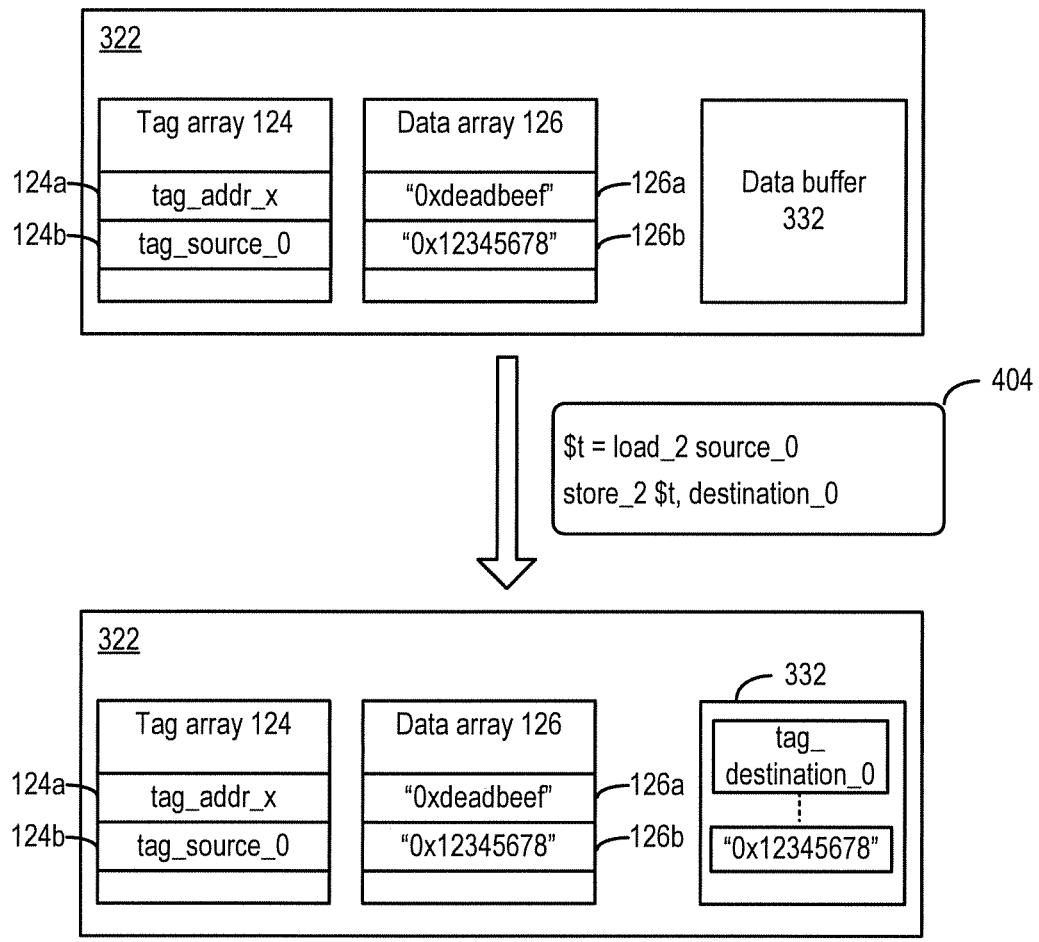
Figure 4C:
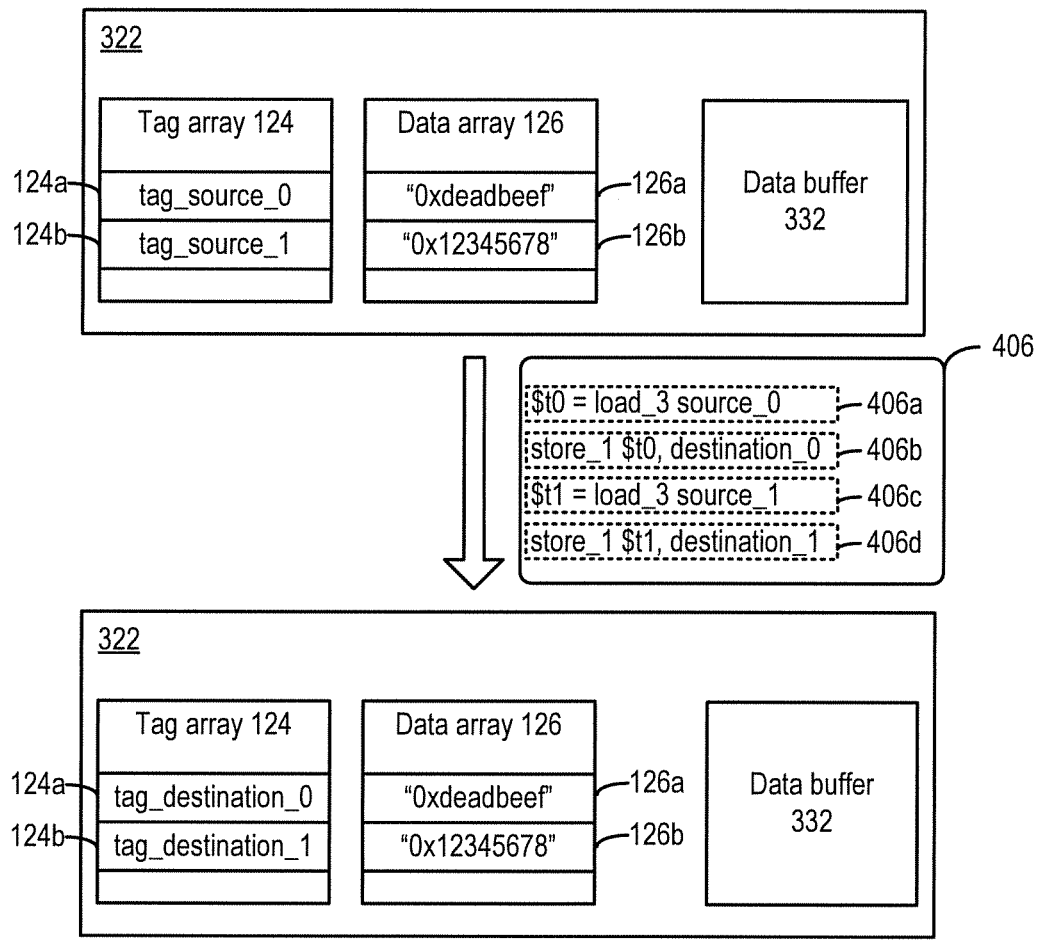

Reference is now made to FIGS. 4A-4C, which illustrate different cache access policies supported by cache 322. FIG. 4A illustrates the contents of cache 322 under the operations of a first cache access policy, consistent with embodiments of the present disclosure. The first cache access policy may include, in a case of cache hit, accessing data (which includes reading stored data or writing new data) in cache 322. The first cache access policy may also include, in a case of cache miss, obtaining memory data from DRAM 132 and storing the memory data into cache 322. In other words, the first cache access policy can be a default cache access policy.

As an illustrative example, referring to FIG. 4A, at a predetermined time point, tag array 124 stores tag addresses "tag_addr_x" and "tag_source_0" in, respectively, tag entries 124a and 124b. Moreover, data array 126 stores data "0xdeadbeef" and "0x12345678" in, respectively, data entries 126a and 126b. Computer processor 302 then executes a set of executable instructions 402, which includes an instruction "load_1" and an instruction "store_1." Both instructions can be generated by a software compiler and can be in binary form. Moreover, both instructions can be associated with a prefix or opcode that indicates the types of the memory access operations involved (e.g., "load_1" is for read operation, "store_1" is for write operation), and that the first cache access policy is to be implemented when cache 322 is accessed for these memory access operations.

Cache controller 328 then generates the tag addresses "tag_source_0" and "tag_destination_0" based on, respectively, the memory addresses "source_0" and "destination_0" associated with the "load_1" and "store_1" instructions. Cache controller 328 may also determine that the tag address "tag_source_0" is found in tag array 124, which indicates a cache hit. Cache controller 328 obtains the data "0x12345678" and provides the data to computer processor 302, which in turn writes the data into a register associated with the variable "$t." On the other hand, cache controller 328 also determines that the tag address "tag_destination_0"

is not stored in tag array 124, which indicates a cache miss. Cache controller 328 then obtains memory data associated with the memory address "destination_0" from DRAM 132. Cache controller 328 may evict the tag address "tag_addr_x" from tag entry 124a, and stores new tag address "tag_destination_0" in tag entry 124a. Cache controller 328 may also evict the data "0xdeadbeef" from data entry 126a, and stores new data "0x12345678" in data entry 126a. The first cache access policy can improve the performance of computer system 300 when handling program codes similar to program code 202 of FIG. 2B, where data stored in the cache (after the execution of memcpy instruction 204) is accessed again by memory access instruction 210.

FIG. 4B illustrates the contents of cache 322 under the operations of a second cache access policy, consistent with embodiments of the present disclosure. The second cache access policy may include, in a case of cache hit, accessing data (which includes reading stored data or writing new data) in cache 322. The second cache access policy may also include, in a case of cache miss, obtaining memory data from DRAM 132, and storing the memory data into data buffer 332, and performing the data access (e.g., read or writing of data) from data buffer 332. The data stored in data buffer 332 can also be populated back into cache 322 later at a predetermined time, or when a predetermined condition is satisfied (e.g., data buffer 332 becoming full). With the second cache access policy, eviction of data due to cache miss can be deferred.

As an illustrative example, referring to FIG. 4B, at a predetermined time point, tag array 124 stores tag addresses "tag_addr_x" and "tag_source_0" in, respectively, tag entries 124a and 124b. Moreover, data array 126 stores data "0xdeadbeef" and "0x12345678" in, respectively, data entries 126a and 126b. Computer processor 302 then executes a set of executable instructions 404, which includes an instruction "load_2" and an instruction "store_2." Both instructions can be generated by a software compiler and can be in binary form. Moreover, both instructions can be associated with a prefix or opcode that indicates the types of the memory access operations involved (e.g., "load_2" being for read operation, "store_2" being for write operation, etc.), and that the second cache access policy is to be implemented when cache 322 is accessed for these memory access operations. Although not explicitly illustrated, it is understood that executable instructions 406 may include other instructions discussed above with respect to FIG. 4A, such as "load_1" and "store_1" instructions.

Cache controller 328 then generates the tag addresses "tag_source_0" and "tag_destination_0" based on, respectively, the memory addresses "source_0" and "destination_0" associated with the "load_2" and "store_2" instructions. Cache controller 328 may also determine that the tag address "tag_source_0" is found in tag array 124, which indicates a cache hit. Cache controller 328 obtains the data "0x12345678" and provide the data to computer processor 302, which in turn writes the data into a register associated with the variable "$t." On the other hand, cache controller 328 also determines that the tag address "tag_destination_0" is not stored in tag array 124, indicating a cache miss. Responsive to determining a cache miss, cache controller 328 obtains memory data associated with the memory address "destination_0" from DRAM 132. Cache controller 328 stores the memory data, and its associated tag address ("tag_destination_0"), in data buffer 332. Cache controller also stores the data to be written to memory address "destination_0" ("0x12345678") into data buffer 332 as well. On the other hand, the tag and data entries associated with the tag address "tag_addr_x," which would have been evicted and overwritten under the first cache access policy, remain in cache 322.

The second cache access policy can be used to improve the performance of computer system 300 when executing a program similar to program 220 of FIG. 2C. As discussed above, the data associated with the tag address "tag_addr_x" may be used by a memory access instruction (e.g., memory access instruction 224) that follows memcpy instruction 204. With embodiments of the present disclosure, memcpy instruction 204 may include a set of instructions that include an indication of the second cache access policy. Based on the indication, cache controller 328 may determine to defer eviction of data from cache 322 during the execution of memcpy instruction 204, and to store the new memory data and tag addresses (which are not stored in cache 322 before the execution of memcpy instruction 204) in data buffer 332. Following the execution of memory instruction 204, and when memory access instruction 224 is executed, cache controller 328 can obtain the data requested by computer processor 302 for memory access instruction 224 (e.g., data associated with tag address "tag_addr_x") from data array 126, instead of from DRAM 132 as in FIG. 2C. As a result, the performance of computer system 300 when handling memory access instruction 224 can be improved.

In some embodiments, cache controller 328 can also populate data accessed by memcpy instruction 204, which is stored in data buffer 332, back to tag array 124 and data array 126 after memory access instruction 224 is executed. As a result, high speed access to those data can still be available to computer processor 302, and not at the expense of memory access instruction 224.

FIG. 4C illustrates the contents of cache 322 under the operations of a third cache access policy, consistent with embodiments of the present disclosure. The third cache access policy may include evicting data accessed by a memory access instruction from tag array 124 and data array 126. The data may be pre-stored in cache 322 before the execution of the memory access instruction, which would have led to a cache hit. The data may also be obtained from DRAM 132 (after determining a cache miss) and written into cache 322 during the execution of the memory access instruction. In both cases, the data will be selectively evicted from cache 322 after the execution of the memory access instruction, to make room for new data.

There are different ways to selectively evict data from cache 322. For example, as discussed above, tag array 124 can store control information for cache operation with each tag address, such as a flag that indicates whether a tag entry and a data entry stores data, as well as LRU information. To vacate a tag entry and a data entry, cache controller 328 may set the flag to indicate that the tag entry and the data entry do not store data, and can be overwritten. Cache controller 328 can also set the LRU information for the tag entry and the data entry so that they will be evicted next time when cache controller 328 looks for a tag entry and a data entry to store new data.

As an illustrative example, referring to FIG. 4C, at a predetermined time point, tag array 124 stores tag addresses "tag_source_0" and "tag_source_1" in, respectively, tag entries 124a and 124b. Moreover, data array 126 stores data "0xdeadbeef" and "0x12345678" in, respectively, data entries 126a and 126b. Computer processor 302 then executes the set of executable instructions 406, which includes instructions 406a and 406c (which are "load_3" instructions), and instructions 406b and 406d (which are "store_1" instructions). All of these instructions can be generated by a software compiler and can be in binary form. As discussed above, "store_1" instruction indicates a write operation that invokes the first cache access policy. Moreover, "load_3" instruction may be associated with a prefix or opcode that indicates it is a read operation, and that the third cache access policy is to be implemented when handling the "load_3" instruction. Although not explicitly illustrated, it is understood that executable instructions 406 may include other instructions discussed above with respect to FIGS. 4A and 4B, such as "load_1" instruction, "load_2" instruction, "store_2" instruction, etc.

When handling the "load_3" instructions 406a and 406c, cache controller 328 generates the tag addresses "tag_source_0" and "tag_source_1" based on, respectively, the memory addresses "source_0" and "source_1" associated with the instructions. Cache controller 328 may also determine that the tag addresses "tag_source_0" and "tag_source_1" are stored in, respectively, tag entries 124a and 124b of tag array 124, which indicates cache hit. Cache controller 328 obtains the data "0xdeadbeef" and "0x12345678" from data entries 126a and 126b associated with these tag address, and provide the data to computer processor 302, which in turn writes the data into a register associated with the variables "$t0" and "t1." After performing read operations for these data from data array 126, cache controller 328 also implements the third cache access policy (based on the "load_3" instructions), and evict these data, and their corresponding tag addresses, from tag array 124 and data array 126. The eviction can be performed by, for example, setting a flag or LRU information that indicates the data and tag entries that store these data are to be overwritten. In some embodiments, in a case where the data to be evicted has been updated by a write operation, cache controller 328 can perform a write-back or a write-through process to populate the updated data back to DRAM 132 before evicting the updated data.

Moreover, when handling the "store_1" instructions 406b and 406d, cache controller 328 generates the tag addresses "tag_destination_0" and "tag_destination_1" based on, respectively, the memory addresses "destination_0" and "destination_1" associated with the instructions. Cache controller 328 also determines that the tag addresses "tag_destination_0" and "tag_destination_1" are not stored in tag array 124, indicating cache miss. Responsive to determining cache miss, cache controller 328 obtains memory data associated with the memory addresses "destination_0" and "destination_1" from DRAM 132. As discussed above, the tag and data entries for the "load_3" instructions are vacated after the "load_3" instructions are executed. Therefore, cache controller 328 can store the tag address and data for "store_1" instruction 406b in, respectively, tag entry 124a and data entry 126a, which are vacated after the execution of "load_3" instruction 406a. Moreover, cache controller 328 can also store the tag address and data for "store_1" instruction 406d in, respectively, tag entry 124b and data entry 126b, which are vacated after the execution of "load_3" instruction 406c.

The third cache access policy can be used to improve the performance of computer system 300 in a similar situation as described in FIG. 2D, in which the indiscriminate caching of data accessed by memcpy instruction 204 can lead to eviction of potentially useful data. For example, as discussed above, it is more likely that after the execution of memcpy instruction 204, it is more likely that the computer processor will reuse either the source data for memcpy instruction 204 (associated with the "source_0" and "source_1" memory addresses), or the data modified by memcpy instruction 204 (associated with the "destination_0" and "destination_1" addresses), but not both. Therefore, the benefit of storing both data in cache 322 may provide little benefit to the overall performance of computer system 300. With the third cache access policy, cache controller 328 can be instructed to evict, for example, the source data for a memcpy instruction (e.g., after the execution of instructions 406a and 406c), to make room for caching the data modified by the memcpy instruction (e.g., after the execution of instructions 406b and 406d). This allows the data modified by the memcpy instruction to stay in the cache, so that high speed access for these data can be provided. As a result, the performance of computer system 300 can be improved.

Referring back to FIGS. 3A-3C, in a case where a computer system (e.g., computer system 300) is configured to support the first, second, and third cache access policies, embodiments of the present disclosure also provide a software application that can process a program instruction to generate a set of memory access instructions that are executable by computer processor 102 and are similar to those as described in FIGS. 3B and 3C. The software application can include, for example, a complier, a linker, etc. The software application can parse a program (e.g., program 202) and identify a program instruction (e.g., memcpy instruction) that accesses the memory. In some embodiments, the software application can correlate the variables accessed by the identified memory access program instruction and other instructions in the program to identify a data dependency relationship, such as those described in FIGS. 2B-2D. Based on the data dependency relationship, the software application can set the opcode (e.g., opcode 350) and/or a prefix (e.g., prefix 360) of the executable memory access instruction to indicate which of the first, second, and third cache access policies are to be performed, when cache controller 328 processes the memory access instruction.

In some embodiments, the memory access program instruction can be a copy (e.g., memcpy) or a move instruction that involves copying or transferring of data from a source memory location to a destination memory location, and can be associated with a code (e.g., an opcode, a prefix, etc.) that indicates the cache access policies for handling data access at the source and destination memory location. The software application can detect the code from the memory access program, and set the opcode (e.g., opcode 350) and/or a prefix (e.g., prefix 360) of the executable memory access instruction accordingly. The following table provides an example of a mapping between the opcodes and the cache access policies:

TABLE 1

| Opcode/ prefix | Cache access policy for source memory location | Cache access policy for destination memory location |
| --- | --- | --- |
| 00_00 | First cache access policy | First cache access policy |
| 00_01 | First cache access policy | Second cache access policy |
| 00_10 | First cache access policy | Third cache access policy |
| 01_00 | Second cache access policy | First cache access policy |
| 01_10 | Second cache access policy | Second cache access policy |
| 01_11 | Second cache access policy | Third cache access policy |
| 10_00 | Third cache access policy | First cache access policy |
| 10_01 | Third cache access policy | Second cache access policy |
| 10_10 | Third cache access policy | Third cache access policy |

As discussed above, the first cache access policy may be a default cache access policy that includes, in a case of cache hit, accessing data (which includes reading stored data or writing new data) in cache 322, and in a case of cache miss, obtaining memory data from DRAM 132 and storing the memory data into cache 322. The second cache access policy may include, in a case of cache hit, accessing data (which includes reading stored data or writing new data) in cache 322, and in a case of cache miss, obtaining memory data from DRAM 132, and storing the memory data into data buffer 332 to defer eviction of data from cache 322. The third cache access policy may include selectively evicting data accessed by the memory access instruction from cache 322 after execution of the instruction completes, regardless of whether there is cache hit or cache miss.

For example, when processing a memory access program instruction associated with an opcode (or prefix) "10_00," a software compiler according to embodiments of the present disclosure may, upon compiling a memory access instruction associated with an opcode (or prefix) "10_00," generate instructions 406a-406d of FIG. 4C, where read instructions (e.g., "load_3") are associated with the third cache access policy, and write instructions (e.g., "store_1") are associated with the first cache access policy. The read and write instructions may include the opcode (e.g., opcode 350) and/or a prefix (e.g., prefix 360) to indicate such. Cache controller 328 can then implement the third cache access policy when performing read operation from the source memory location (e.g., based on the "load_3" instruction), and implement the first cache access policy when performing write operation to the destination memory location (e.g., based on the "store_1" instruction), as described above respect to FIG. 4C.

Reference is now made to FIGS. 5A-5D, which illustrates an exemplary method 500 of operating a cache. The method can be performed by, for example, cache controller 328 in conjunction with other components of computer system 300 of FIG. 3A.

After an initial start, the controller receives, from a computer processor (e.g., computer processor 302), a cache access request, in step 502. The cache access request may be associated with a write operation or a read operation. The cache access request may include a memory address for the operation, as well as an indication of a cache access policy associated with the operation.

After receiving the cache access request, the controller determines the cache access policy based on indication, in step 504. The indication may be in the form of a code such as, for example, a value of an opcode, a prefix, etc. Based on the value of the opcode (or prefix), the controller can determine whether the cache access request is associated with the first cache access policy (in step 506), the second cache access policy (in step 508), or the third cache access policy (in step 510). If the controller determines that the cache access request is not associated with any of these cache access policies (in step 510), the method may proceed to the end.

Figure 5A:
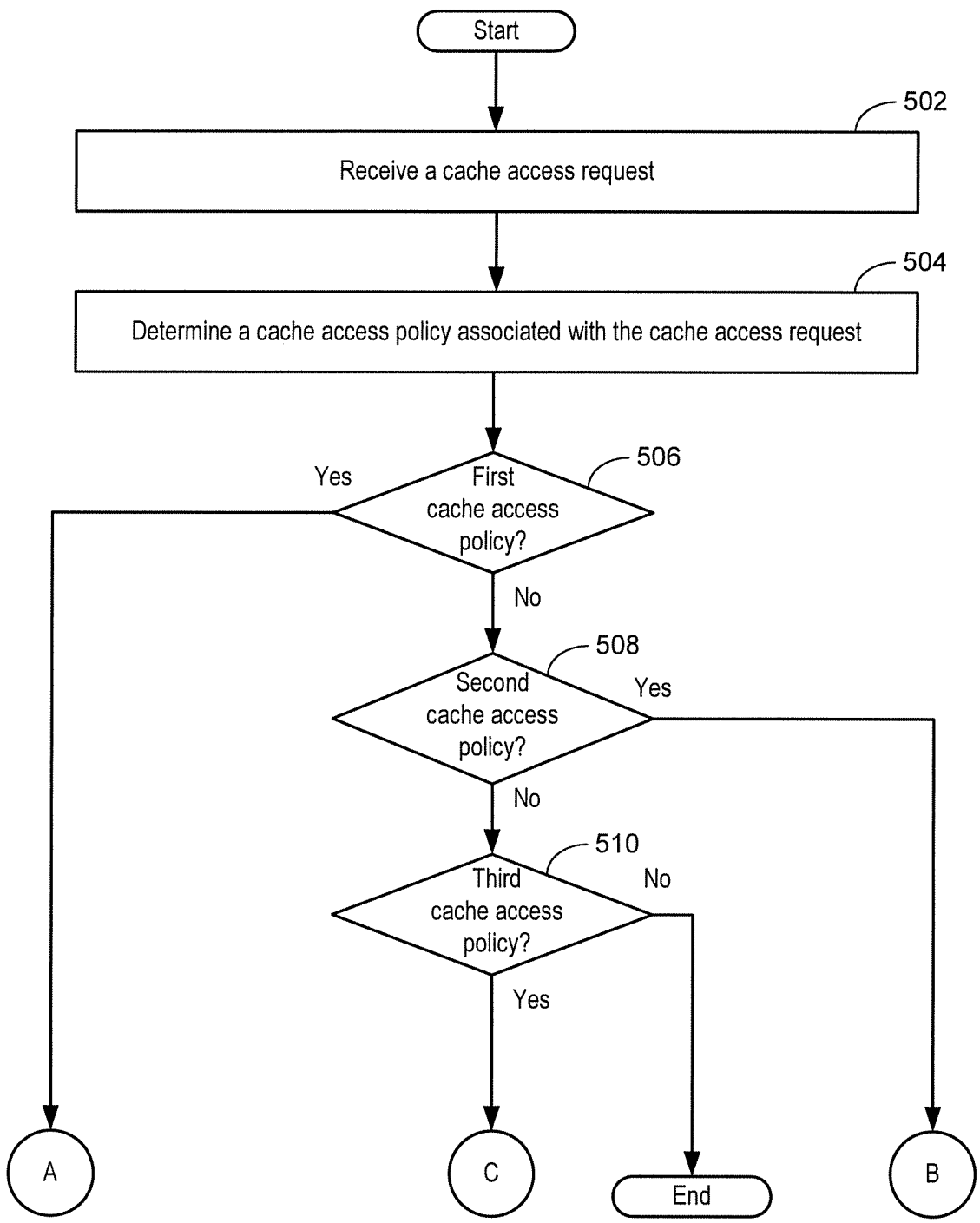
FIGS. 5A-5D are flowcharts illustrating an exemplary method of operating a cache, consistent with embodiments of the present disclosure.
Figure 5B:
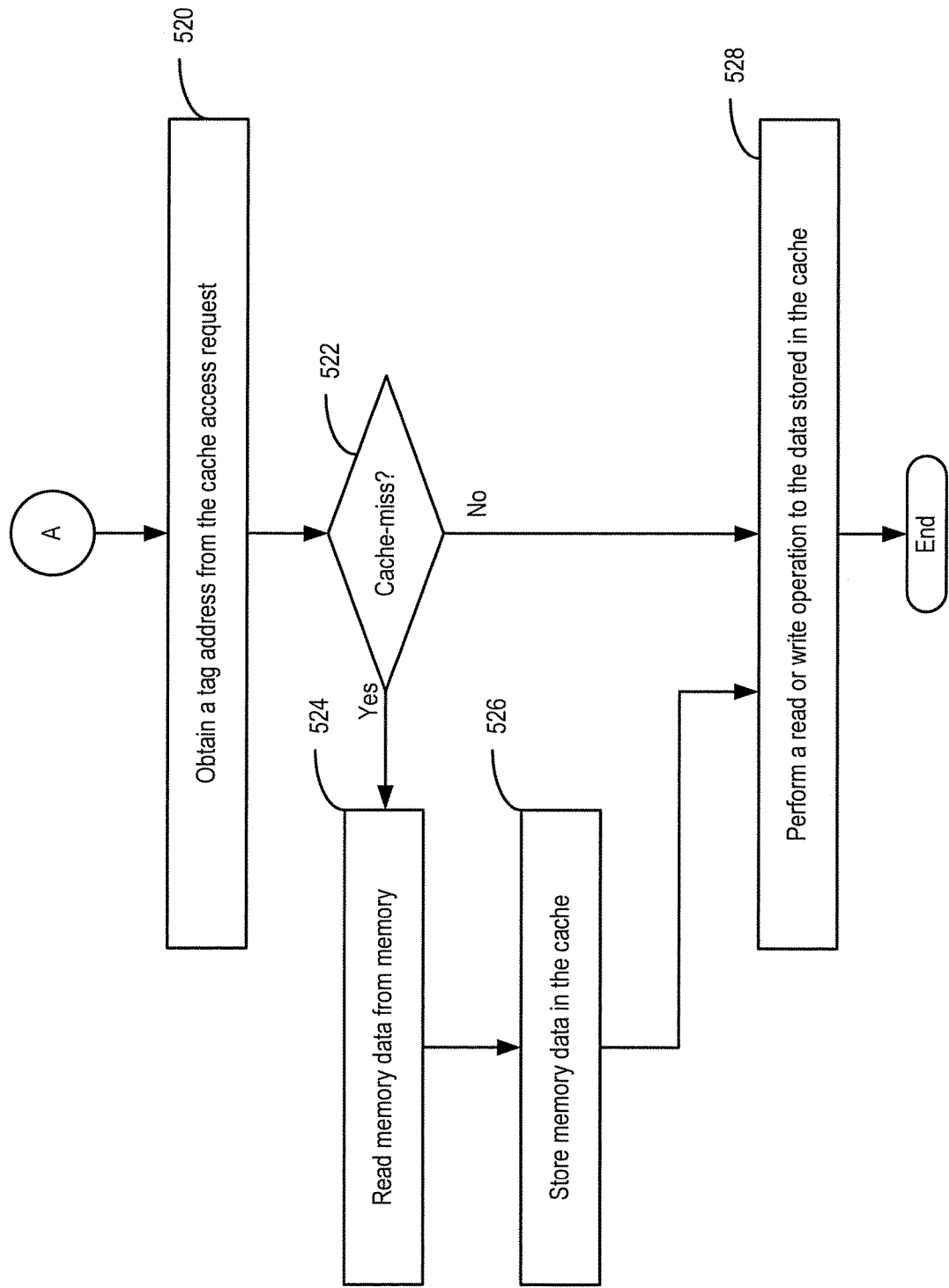

Referring to FIG. 5B, after the controller determines that cache access request is associated with the first cache access policy (in step 506 of FIG. 5A), the controller can obtain a tag address based on the memory address included in the cache access request, in step 520. The controller can then determine, based on whether tag address is stored in cache 322, whether there is a cache miss, in step 522. After the controller determines that there is a cache miss (in step 522), the controller can perform a read access operation from DRAM 132 to obtain memory data (in step 524), and store the memory data in the cache (in step 526). After storing the memory data in the cache (in step 526), or after determining that there is cache hit (in step 522), the controller can then perform, according to the cache access request, a read or write operation to the data stored in the cache, in step 528. Method 500 can then proceed to the end, and the controller can process the next cache access request.

Figure 5C:
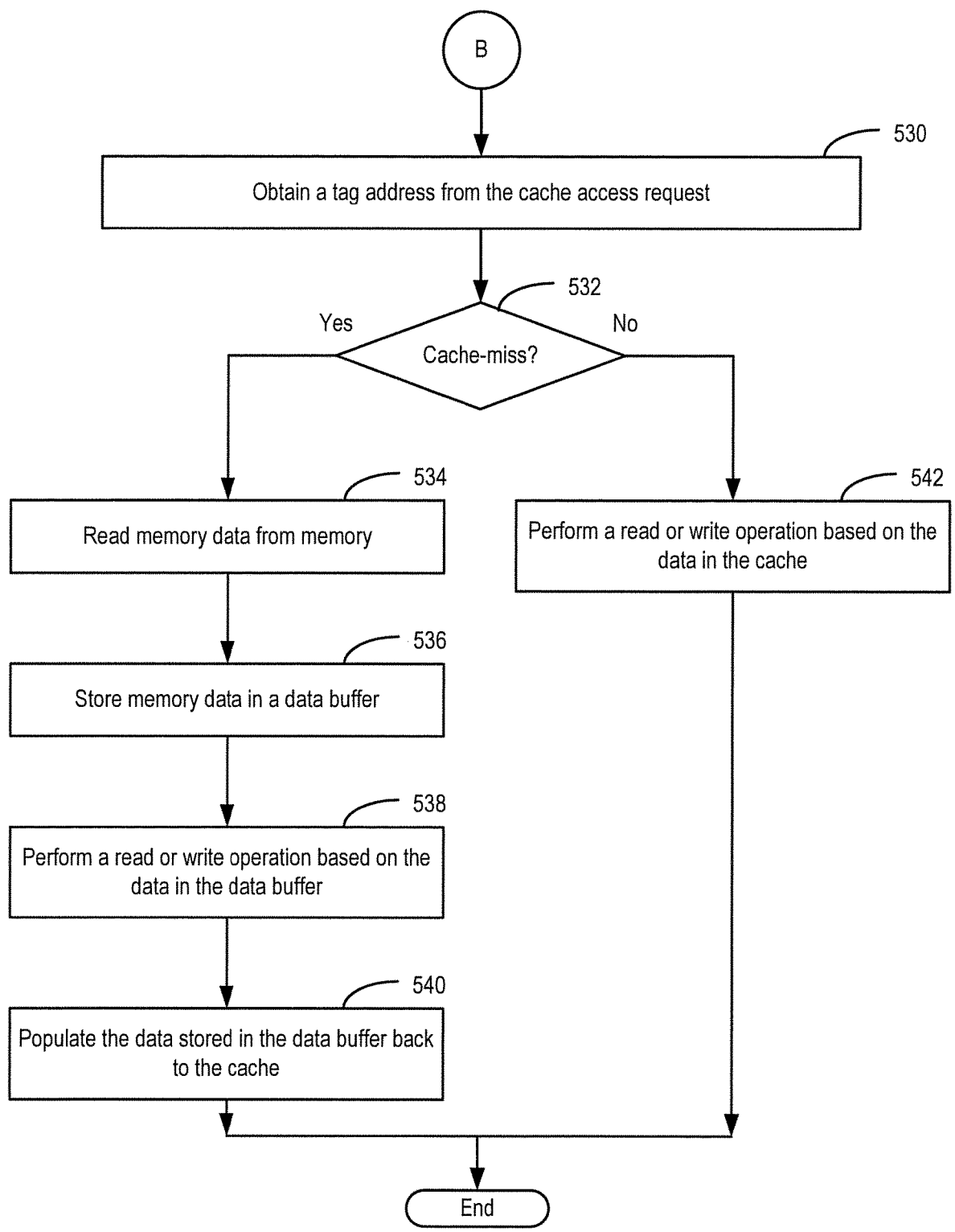

Referring to FIG. 5C, after the controller determines that cache access request is associated with the second cache access policy (in step 508 of FIG. 5A), the controller can obtain a tag address based on the memory address included in the cache access request, in step 530. The controller can then determine, based on whether the tag address is stored in cache 322, whether there is a cache miss, in step 532. After determining there is a cache miss (in step 532), the controller can perform a read access operation from DRAM 132 to obtain memory data (in step 534), and then store the memory data in a data buffer (in step 536). After storing the memory data in the data buffer (in step 536), the controller can then perform, according to the cache access request, a read or write operation to the data stored in the data buffer, in step 538. The controller can also populate the data stored in the data buffer back to the cache at a predetermined time point, in step 540. Method 500 can then proceed to the end, and the controller can process the next cache access request.

On the other hand, after the controller determines that there is there is a cache hit (in step 532), the controller can perform, according to the cache access request, a read or write operation to the data stored in the cache, in step 542. Method 500 can then proceed to the end, and the controller can process the next cache access request.

Figure 5D:
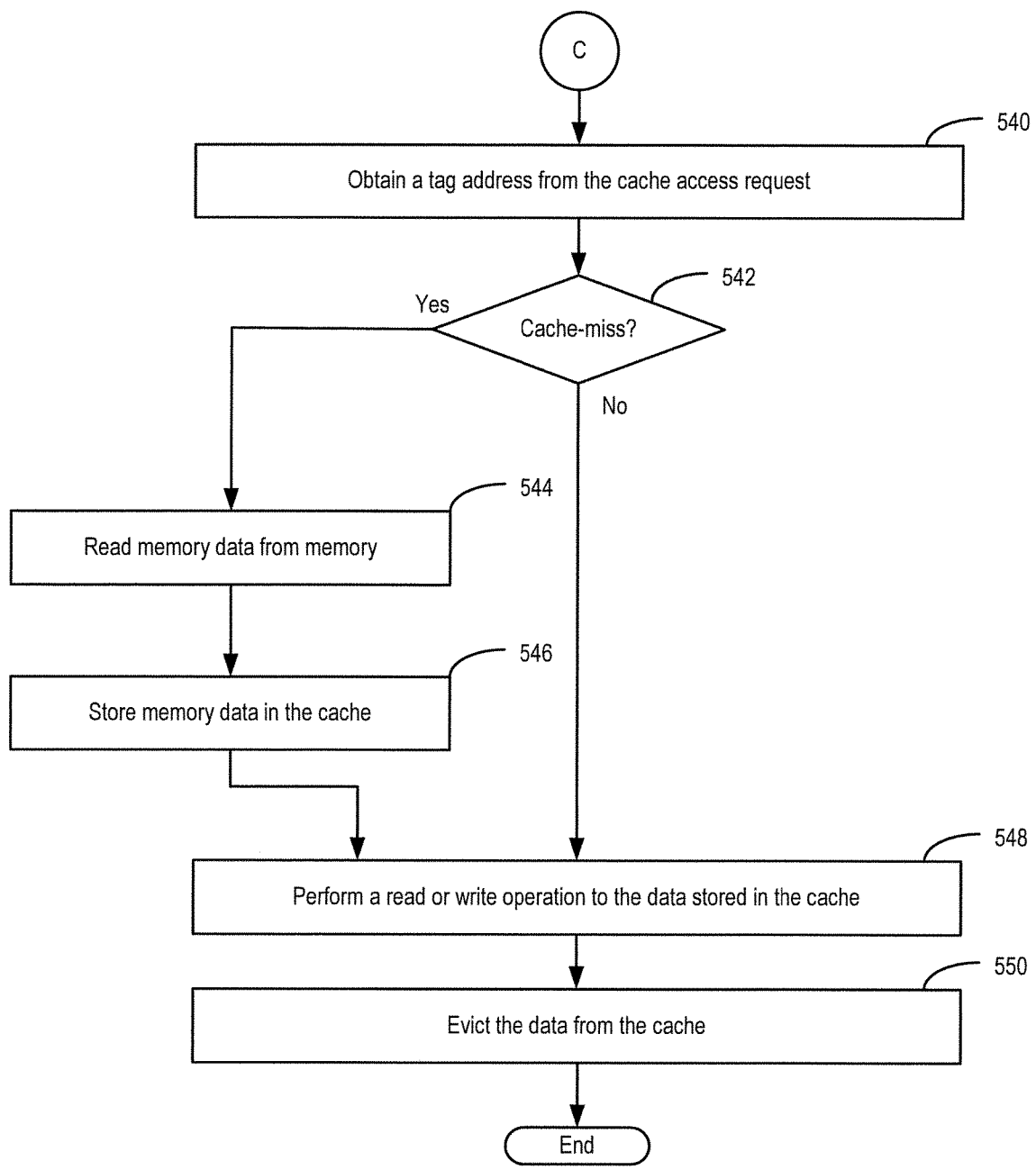

Referring to FIG. 5D, after the controller determines that cache access request is associated with the third cache access policy (in step 510 of FIG. 5A), the controller can obtain a tag address based on the memory address included in the cache access request, in step 540. The controller can then determine, based on whether the tag address is stored in cache 322, whether there is a cache miss, in step 542. After determining there is a cache miss (in step 542), the controller can perform a read access operation from DRAM 132 to obtain memory data (in step 544), and store the memory data in the cache (in step 546). After storing the memory data in the cache (in step 546), or after determining that there is cache hit (in step 542), the controller can then perform, according to the cache access request, a read or write operation to the data stored in the cache, in step 548. The controller can then evict that data from the cache, in step 550. In situations where a write operation is performed to update the data, the controller can perform a write-through or a write-back process to populate the updated data back to a memory (e.g., DRAM 132), before evicting the data. Method 500 can then proceed to the end, and the controller can process the next cache access request.

Other embodiments of the invention will be apparent to those skilled in the art from consideration of the specification and practice of the invention disclosed herein. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims. Method 500 can then proceed to an end.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A cache comprising:
a tag array configured to store one or more tag addresses;
a data array configured to store data acquired from a dynamic random access memory device; and
a cache controller configured to:
receive a cache access request;
determine, based on an indication associated with the cache access request, a cache access policy of a plurality of cache access policies, wherein the indication comprises a code that is used to select the cache access policy based on a mapping between a plurality of codes including the code and a plurality of cache access policies including the cache access policy, wherein the code includes a set of bits indicating a corresponding cache access policy at a source memory location and a corresponding cache access policy at a destination memory location, wherein the code comprises an opcode, an operand or a prefix, and wherein the set of bits is included in the opcode, or in the operand, or in the prefix; and
perform an operation to at least one of the tag array or to the data array based on the determined cache access policy.

2. The cache of claim 1, wherein the cache access policy is determined from a set of cache access policies supported by the cache controller; wherein the set of cache access policies includes a first cache access policy, a second cache access policy, and a third cache access policy.

3. The cache of claim 2, wherein the determined cache access policy is the first cache access policy;
in response to the determined cache policy being the first cache access policy, wherein the performance of the operation includes the cache controller being further configured to:
determine a first tag address from a memory address associated with the cache request;
determine, based on the first tag address and the one or more tag addresses stored in the tag array, whether there is a cache miss;
responsive to the determination that there is a cache miss, acquire memory data from the dynamic random access memory device and store the memory data in the data array; and
perform, based on the cache access request, one of a read operation or a write operation to the data array.

4. The cache of claim 2, further comprising a data buffer; wherein the determined cache access policy is the second cache access policy;
in response to the determined cache policy being the second cache access policy, wherein the performance of the operation includes the cache controller being further configured to:
determine a first tag address from a memory address associated with the cache request;
determine, based on the first tag address and the one or more tag addresses stored in the tag array, whether there is a cache miss;
responsive to the determination that there is a cache miss:
acquire memory data from the dynamic random access memory device,
store the memory data in the data buffer, and
perform, based on the cache access request, one of a read operation or a write operation to the data buffer;
responsive to the determination that there is a cache hit:
perform, based on the cache access request, one of a read operation or a write operation to the data array.

5. The cache of claim 2, wherein the determined cache access policy is the third cache access policy;
in response to the determined cache policy being the third cache access policy, wherein the performance of the operation includes the cache controller being further configured to:
determine a first tag address from a memory address associated with the cache request;
determine, based on the first tag address and the one or more tag addresses stored in the tag array, whether there is a cache miss;
responsive to the determination that there is a cache miss, acquire memory data from the dynamic random access memory device and store the memory data in the data array;
perform, based on the cache access request, one of a read operation or a write operation to first data stored in the data array; and
evict the first data from the data array.

6. The cache of claim 1, wherein the indication is associated with a code associated with a memory access instruction.

7. A method of operating a cache that comprises a tag array, a data array, and a cache controller, the method being performed by the cache controller and comprising:
receiving a cache access request;
determining, based on an indication associated with the cache access request, a cache access policy of a plurality of cache access policies, wherein the indication comprises a code that is used to select the cache access policy based on a mapping between a plurality of codes including the code and a plurality of cache access policies including the cache access policy, and wherein the code includes a set of bits indicating a corresponding cache access policy at a source memory location and a corresponding cache access policy at a destination memory location, wherein the code comprises an opcode, an operand or a prefix, and wherein the set of bits is included in the opcode, or in the operand, or in the prefix; and
performing an operation to at least one of the tag array or to the data array based on the determined cache access policy.

8. The method of claim 7, wherein the cache access policy is determined from a set of cache access policies supported by the cache controller; wherein the set of cache access policies includes a first cache access policy, a second cache access policy, and a third cache access policy.

9. The method of claim 8, wherein the determined cache access policy is the first cache access policy;
wherein, in response to the determined cache access policy being the first cache access policy, performing the operation comprises:
determining a first tag address from a memory address associated with the cache request;
determining, based on the first tag address and the one or more tag addresses stored in the tag array, whether there is a cache miss;
responsive to determining that there is a cache miss, acquiring memory data from the dynamic random access memory device and storing the memory data in the data array; and
performing, based on the cache access request, one of a read operation or a write operation to the data array.

10. The method of claim 8, wherein the cache further comprises a data buffer;
wherein the determined cache access policy is the second cache access policy;
wherein, in response to the determined cache access policy being the first cache access policy, performing the operation comprises:
determining a first tag address from a memory address associated with the cache request;
determining, based on the first tag address and the one or more tag addresses stored in the tag array, whether there is a cache miss;
responsive to determining that there is a cache miss:
acquiring memory data from the dynamic random access memory device,
storing the memory data in the data buffer, and
performing, based on the cache access request, one of a read operation or a write operation to the data buffer;
responsive to determining that there is a cache hit:
performing, based on the cache access request, one of a read operation or a write operation to the data array.

11. The method of claim 8, wherein the determined cache access policy is the third cache access policy;
wherein, in response to the determined cache access policy being the third cache access policy, performing the operation comprises:
determining a first tag address from a memory address associated with the cache request;
determining, based on the first tag address and the one or more tag addresses stored in the tag array, whether there is a cache miss;
responsive to determining that there is a cache miss, acquiring memory data from the dynamic random access memory device and storing the memory data in the data array;
performing, based on the cache access request, one of a read operation or a write operation to first data stored in the data array; and
evicting the first data from the data array.

12. The method of claim 8, wherein the indication is associated with a code associated with a memory access instruction.

13. A computer system, comprising:
a hardware processor configured to:
process a memory access instruction that includes an indication for a cache access policy, and
generate a cache access request including information related to the indication;
and
a hierarchical memory system coupled with the hardware processor, comprising:
a dynamic random access memory device; and
a cache comprising:
a tag array configured to store one or more tag addresses,
a data array configured to store data acquired from the dynamic random access memory device, and
a cache controller configured:
receive the cache access request from the hardware processor,
determine, based on the information included in cache access request, a cache access policy of a plurality of cache access policies, wherein the indication comprises a code that is used to select the cache access policy based on a mapping between a plurality of codes including the code and a plurality of cache access policies including the cache access policy, and wherein the code includes a set of bits indicating a corresponding cache access policy at a source memory location and a corresponding cache access policy at a destination memory location, wherein the code comprises an opcode, an operand or a prefix, and wherein the set of bits is included in the opcode, or in the operand, or in the prefix, and
perform an operation to at least one of the tag array or to the data array based on the determined cache access policy.

14. The computer system of claim 13, wherein the cache access policy is determined from a set of cache access policies supported by the cache controller; wherein the set of cache access policies includes a first cache access policy, a second cache access policy, and a third cache access policy.

15. The computer system of claim 14, wherein the determined cache access policy is the first cache access policy; in response to the determined cache policy being the first cache access policy, wherein the performance of the operation includes the cache controller being further configured to:
determine a first tag address from a memory address associated with the cache request;
determine, based on the first tag address and the one or more tag addresses stored in the tag array, whether there is a cache miss;
responsive to determining that there is a cache miss, acquire memory data from the dynamic random access memory device and store the memory data in the data array; and
perform, based on the cache access request, one of a read operation or a write operation to the data array.

16. The computer system of claim 14, further comprising a data buffer; wherein the determined cache access policy is the second cache access policy;
in response to the determined cache policy being the second cache access policy, wherein the performance of the operation includes the cache controller being further configured to:
determine a first tag address from a memory address associated with the cache request;
determine, based on the first tag address and the one or more tag addresses stored in the tag array, whether there is a cache miss;
responsive to determining that there is a cache miss:
acquire memory data from the dynamic random access memory device,
store the memory data in the data buffer, and
perform, based on the cache access request, one of a read operation or a write operation to the data buffer;
responsive to determining that there is a cache hit:
perform, based on the cache access request, one of a read operation or a write operation to the data array.

17. The computer system of claim 14, wherein the determined cache access policy is the third cache access policy;
in response to the determined cache policy being the third cache access policy, wherein the performance of the operation includes the cache controller being further configured to:
determine a first tag address from a memory address associated with the cache request;

determine, based on the first tag address and the one or more tag addresses stored in the tag array, whether there is a cache miss;

responsive to determining that there is a cache miss, acquire memory data from the dynamic random access memory device and store the memory data in the data array;

perform, based on the cache access request, one of a read operation or a write operation to first data stored in the data array; and evict the first data from the data array.

18. The computer system of claim 14, wherein the indication is associated with a code associated with a memory access instruction.

19. The cache of claim 1, wherein the code includes four bits.

* * * * *